United States Patent
Colvin et al.

(10) Patent No.: US 7,350,602 B2
(45) Date of Patent: Apr. 1, 2008

(54) SYSTEM AND METHOD FOR ENGINE START DETECTION FOR HYBRID VEHICLES

(75) Inventors: Dan Colvin, Farmington Hills, MI (US); Walt Ortmann, Saline, MI (US); Marvin Kraska, Dearborn, MI (US); Kathleen Bailey, Dearborn, MI (US); Mark Yamazaki, Canton, MI (US); Brandon Masterson, Whitmore Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 174 days.

(21) Appl. No.: 10/710,530

(22) Filed: Jul. 19, 2004

(65) Prior Publication Data

US 2006/0011394 A1  Jan. 19, 2006

(51) Int. Cl.
B60K 6/02 (2006.01)
(52) U.S. Cl. .................... 180/65.2; 903/941
(58) Field of Classification Search ........... 180/65.2, 180/65.3, 65.4; 701/99, 110; 123/436, 179.3
See application file for complete search history.

(56) References Cited

U.S. PATENT DOCUMENTS

| | | | | |
|---|---|---|---|---|
| 4,335,429 | A * | 6/1982 | Kawakatsu | ............... 701/102 |
| 5,024,082 | A | 6/1991 | Ohkubo et al. | |
| 5,615,654 | A * | 4/1997 | Weisman et al. | ........... 123/350 |
| 5,639,960 | A * | 6/1997 | Nakagawa | ................ 73/116 |
| 6,123,163 | A | 9/2000 | Otsu et al. | |
| 6,176,807 | B1 | 1/2001 | Oba et al. | |
| 6,176,808 | B1 | 1/2001 | Brown et al. | |
| 6,233,508 | B1 | 5/2001 | Deguchi et al. | |
| 6,253,127 | B1 | 6/2001 | Itoyama et al. | |
| 6,274,943 | B1 | 8/2001 | Hasegawa et al. | |
| 6,330,498 | B2 | 12/2001 | Tamagawa et al. | |
| 6,338,391 | B1 * | 1/2002 | Severinsky et al. | ........ 180/65.2 |
| 6,364,807 | B1 | 4/2002 | Koneda et al. | |
| 6,494,277 | B1 | 12/2002 | Boggs et al. | |
| 6,504,259 | B1 | 1/2003 | Kuroda et al. | |
| 6,516,253 | B2 | 2/2003 | Boggs et al. | |
| 6,542,798 | B2 | 4/2003 | Kotre et al. | |
| 6,550,452 | B2 * | 4/2003 | Schneider | .............. 123/436 |

(Continued)

FOREIGN PATENT DOCUMENTS

JP   11027805 A   1/1999

OTHER PUBLICATIONS

Colvin, Dan et al., *Challenges of Engine Starts and Drivability in a Parallel Hybrid-Electric System*, SAE Technical Paper Series, 2004-01-0063.

(Continued)

*Primary Examiner*—Frank Vanaman
(74) *Attorney, Agent, or Firm*—David B. Kelley; Brooks Kushman P.C.

(57) ABSTRACT

A method for operating a hybrid vehicle having a primary power generating system and a secondary power generating system coupled via a power transmission assembly for delivery of tractive force for the vehicle. The method includes determining acceleration of input speed to the power transmission assembly when the primary power generating system is deactivated, and inferring activation of the primary power generating system based at least in part on the acceleration of the power transmission assembly.

12 Claims, 10 Drawing Sheets

U.S. PATENT DOCUMENTS

| | | |
|---|---|---|
| 6,581,705 B2 | 6/2003 | Phillips et al. |
| 6,799,546 B1 * | 10/2004 | Gonring et al. .......... 123/179.3 |
| 6,959,242 B2 * | 10/2005 | Katoh et al. ................ 701/104 |
| 7,028,657 B2 * | 4/2006 | Sah et al. ................ 123/179.3 |
| 2001/0044683 A1 | 11/2001 | Takaoka et al. |

OTHER PUBLICATIONS

Hebbale, K.V., et al., A Speed and Acceleration Estimatin Algorithm for Powertrain Control, Proceedings of the 1991 American Control Conference, Boston, Massachusetts, Jun. 26-28, 1991, sponsored by the American Automatic Control Council, pp. 415-420.

* cited by examiner

| GEAR | RC | FC | DC | LR | 2,4 | RATIO |
|---|---|---|---|---|---|---|
| 1ST |  | X |  | X |  | 2.889 |
| 2ND |  | X |  |  | X | 1.571 |
| 3RD |  | X | X |  |  | 1.000 |
| 4TH |  |  | X |  | X | 0.698 |
| REV | X |  |  | X |  | 2.310 |

SYSTEM AND METHOD FOR ENGINE START DETECTION FOR HYBRID VEHICLES

BACKGROUND OF INVENTION

1. Field of the Invention

The invention relates generally to a system and method for engine start detection for hybrid vehicles, and more particularly to a system and method for engine start detection for the indication of the transition from electric motor drive to engine drive.

2. Background Art

Hybrid electric vehicles utilize a combination of an internal combustion engine (ICE) in connection with an electric motor that is fed electrical energy from a battery to provide the power needed to propel a vehicle (i.e., provide power to vehicle wheels) for improved fuel economy when compared to a conventional (i.e., an internal combustion engine only) vehicle. In a hybrid vehicle, fuel economy can be improved by shutting down (i.e., turning off) the engine, especially when the ICE operates inefficiently, and using the electric motor to provide all of the power needed to propel the vehicle.

However, when the user (e.g., driver of the vehicle) wants more power than the electric motor can provide or when the battery becomes depleted, a quick and smooth engine start that is substantially transparent to the driver is desirable. That is, the transition from only electric motor drive to ICE drive (or combined electric motor and ICE drive) should be seamless.

Systems and methods for determining engine starting in hybrid vehicles have been proposed. In U.S. Pat. No. 6,274,943, for example, elapse of time is measured after the current command value supplied to the generator-motor becomes less than a reference value, and it is determined whether the detected engine speed is greater or equal to a combustion-completion discriminating speed after the measured time has reached a predetermined value. Then, it is determined whether the detected engine speed is determined to be greater or equal to the combustion-completion engine speed, and if it is, it is discriminated that the engine is definitely started. However, such conventional systems and methods can have a harsh, rough, and inefficient transition from purely electric propulsion of the vehicle to other modes of powertrain operation (e.g., ICE only, or a combination of ICE and electric motor).

During the engine start, the electric motor should provide torque to turn the ICE to start speed in addition to propelling the vehicle. When the engine begins to provide torque, the motor torque should be reduced proportionally to provide a smooth transfer of torque to the wheels. When the motor torque and the engine torque are mismatched, any one or more of efficiency, smoothness and shift time may be adversely influenced using conventional approaches.

Thus, to efficiently and smoothly synchronize the transition from purely electric propulsion of the vehicle to other modes of powertrain operation (e.g., ICE only, or a combination of ICE and electric motor), there is a need for accurately determining when the engine has actually started and is producing torque.

SUMMARY OF INVENTION

The present invention generally provides a system and method for engine start detection for hybrid vehicles. The system and method for engine start detection of the present invention generally provides for a transition from electric motor drive to internal combustion engine (ICE) drive (or combined electric motor and internal combustion engine drive) that is substantially seamless. The transition from only electric propulsion of the vehicle as implemented in connection with the present invention may be substantially transparent to the driver, and is generally robust under a variety of vehicle operating conditions. A quick and smooth engine start as provided by the present invention may be more efficient and smooth than the engine start encountered using conventional approaches.

A method for operating a hybrid vehicle is disclosed. The vehicle has a primary power generating system and a secondary power generating system coupled via a power transmission assembly for delivery of tractive force for the vehicle. The method comprises determining acceleration of input speed to the power transmission assembly when the primary power generating system is deactivated, and inferring activation of the primary power generating system based at least in part on the acceleration of the power transmission assembly.

Further, a powertrain system for operating a hybrid vehicle is disclosed. The system comprises a primary power generating system, a secondary power generating system, and a controller. The primary power generating system and secondary power generating system are coupled via a power transmission assembly for delivery of tractive force for the vehicle. The controller is configured to determine acceleration of the power transmission assembly when the primary power generating system is deactivated, and infer activation of the primary power generating system based at least in part on the acceleration of the power transmission assembly.

Yet further, a method for operating a hybrid vehicle having a primary power generating system and a secondary power generating system coupled via a power transmission assembly for delivery of tractive force for the vehicle is disclosed. The method comprises determining speed of the secondary power generating system, and speed of the primary power generating system, and inferring activation of the primary power generating system based at least in part on the absolute value of the difference between the speed of the primary power generating system and the speed of the secondary power generating system.

Further advantages, objectives and features of the invention will become apparent from the following detailed description and accompanying figures disclosing illustrative embodiments of the invention.

BRIEF DESCRIPTION OF DRAWINGS

FIGS. 2(a-c) are diagrams of a hybrid electric powertrain system and controller where the present invention may be implemented;

FIGS. 3(a-c) are diagrams of alternative methods of engine start detection of the present invention; and FIGS. 4(a-d) are diagrams of plots of operation of a vehicle in connection with the present invention.

DETAILED DESCRIPTION

Figure 1:
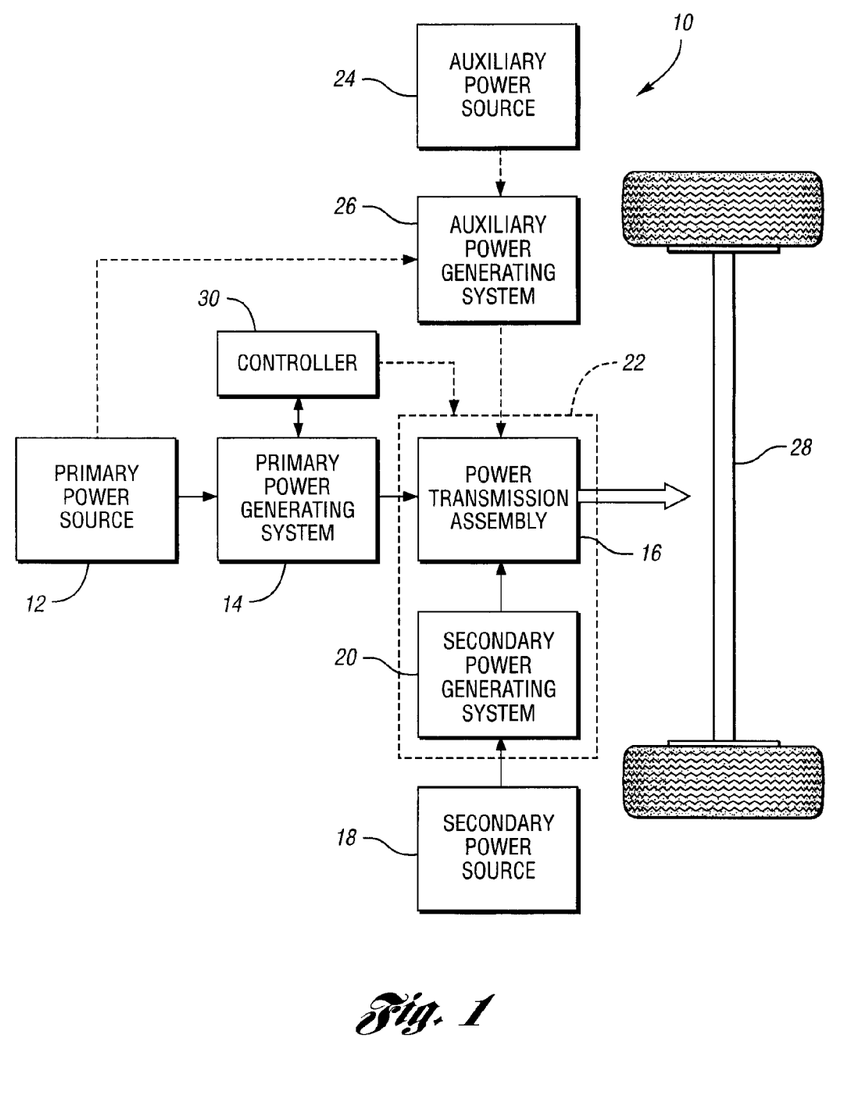
FIG. 1 is a diagram of a generic hybrid electric powertrain system.

Referring to FIG. 1, a generic architecture for a hybrid vehicle system 10 in accordance with the present invention is shown. The system 10 includes a primary power source 12, such as a gasoline, diesel, hydrogen, or other fuel, coupled to a primary power generating system 14, such as an internal combustion engine (ICE). The primary power generating system 14 generates a primary torque drive (i.e., mechanical power) that is transmitted to a driveline 28 for providing tractive power to vehicle traction wheels via a power transmission assembly 16.

The power transmission assembly 16 can be implemented as a conventional manual, automatic or continuously variable vehicular transmission, or similar gearing mechanism for transmitting mechanical power produced by the primary power generating system 14.

The system 10 further includes a secondary power source 18, such as a battery, capacitor, ultracapacitor, cell, hydraulic accumulator, flywheel or other appropriate energy storage device to meet the design criteria of a particular application connected to an electric machine to provide electrical energy to the electric machine in a motoring mode of vehicle operation, and a secondary power generating system 20, such as one or more electric machines or other appropriate torque generating devices (e.g., an electric machine that performs as a motor in one mode of operation, performs as an electrical energy generator (i.e., alternator) in another mode of operation, and may perform as a starter in yet another mode of operation (i.e., a S/A motor)), for providing the drive torque or supplementing the drive torque delivered by the primary power generating system 14. The system 10 may yet further include an auxiliary power source 24 that is coupled to an auxiliary power generating system 26, such as a fuel cell system or auxiliary power unit (APU), for providing yet additional drive torque.

The power transmission assembly 16 generally transmits the output power of both the ICE 14 and the secondary power generating system 20 to the vehicle driveline 28. The power transmission assembly 16 is preferably implemented as a converter-less automatic transmission constructed and arranged with the secondary power generating system 20, which is preferably implemented as an integrated high voltage electric motor/generator. A clutch mechanism is generally implemented in connection with the power transmission assembly 16 for coupling and decoupling the ICE 14. Advantageously, the power transmission assembly 16 and the secondary power generating system 20 can be packaged into a single modular hybrid transmission unit 22. The vehicle powertrain system 10 may be implemented as so-called "series", "parallel", or "series-parallel" hybrid configurations as is well known in the art.

A controller 30 (e.g., a powertrain controller, a vehicle system controller, a powertrain control module, etc.) is generally implemented in communication with one or more components of the system 10 (e.g., the primary power generating system 14, the secondary power generating system 20, and the modular unit 22) to control the operation of the system 10. The controller 30 may be advantageously implemented in connection with at least one of the primary power generating system 14, the secondary power generating system 20, the modular unit 22, etc.

The present invention generally provides for an improved system and method for engine start detection for hybrid vehicles. The improved system and method for engine start detection of the present invention is generally implemented in connection with at least one memory (e.g., random access memory (RAM), read only memory (ROM), EPROM, EEPROM, flash, etc.) and processor in the controller 30. In one example, the improved system and method for engine start detection may be implemented in connection with a transmission for the hybrid powertrain system 10 as shown in FIG. 1.

Figure 2A:
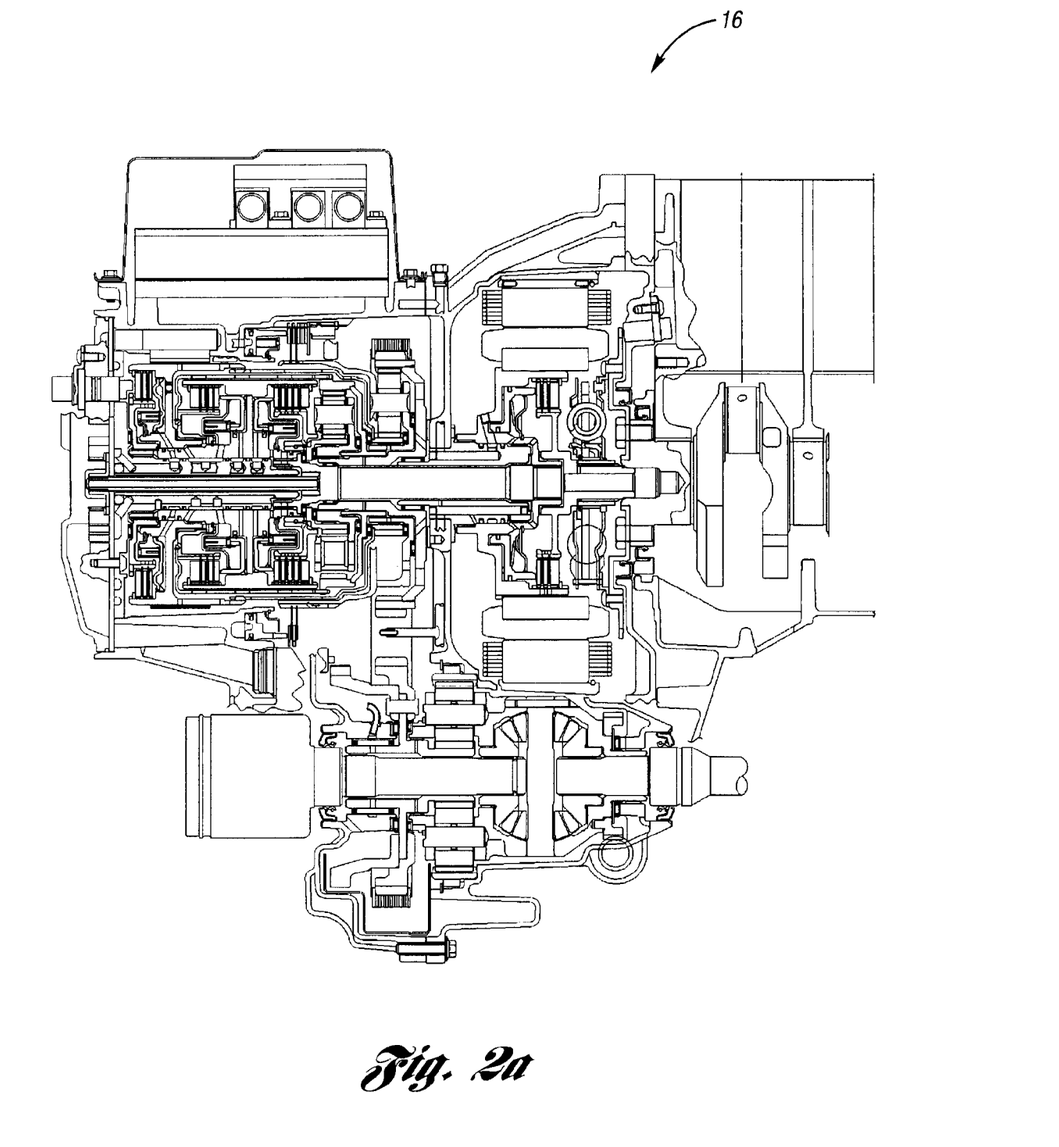
Figure 2B:
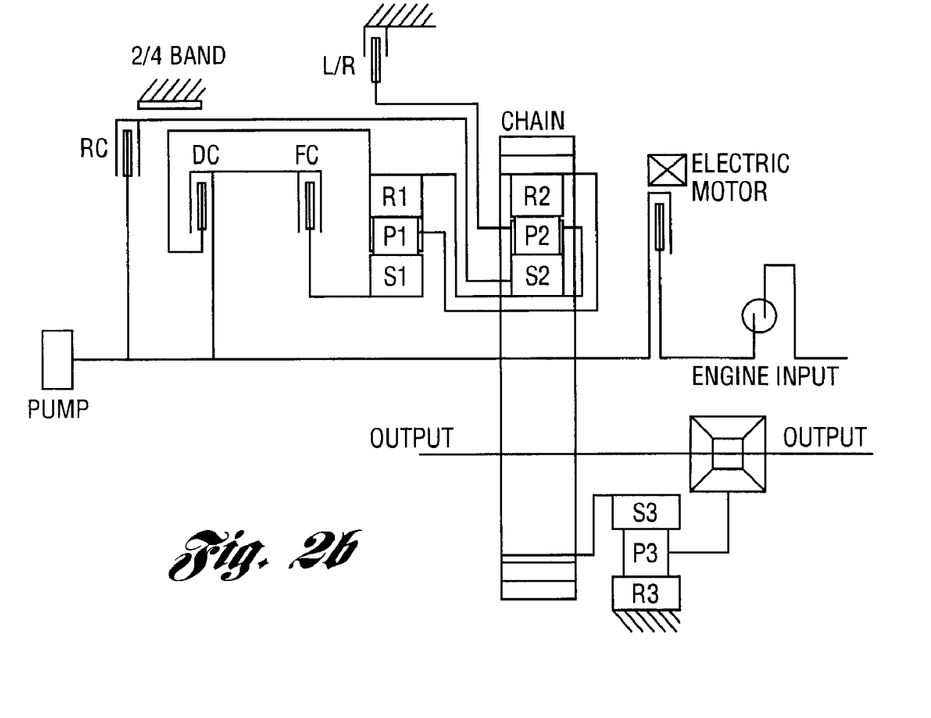
Figure 2C:
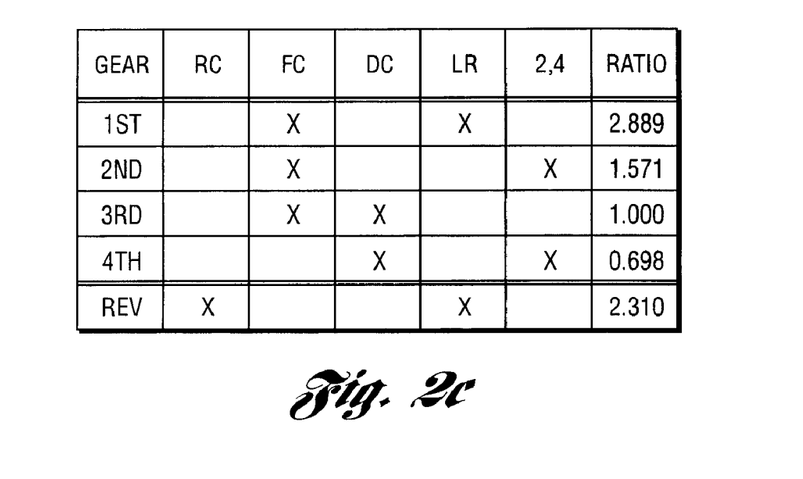

Referring to FIG. 2, the present invention may advantageously incorporate an electric converterless transmission system (e.g., the transmission 16) that can be operative to couple and decouple the internal combustion engine from the electric motor. Such a hybrid powertrain system is described, for example, in U.S. Pat. No. 6,176,808 (hereinafter the '808 patent), which is hereby incorporated by reference in its entirety. The electric machine 20 that is implemented in connection with the hybrid powertrain system 16 of the '808 patent is packaged at the input to the transmission.

When an engine start is requested (i.e., commanded, demanded, etc. via a respective control signal), a controller for the powertrain 22 generally begins to control (i) the slip of an input clutch, (ii) the torque of the electric machine, and (iii) the engagement of the engine clutch. When engine 14 turning has been determined, fuel is generally delivered to the engine and the engine start detection strategy (i.e., method, steps, blocks, routine, algorithm, process, procedure, etc.) of the present invention may be initiated. The powertrain 22 generally completes the engagement of the engine clutch while continuing to control the input clutch and the electric machine 20.

Figure 3A:
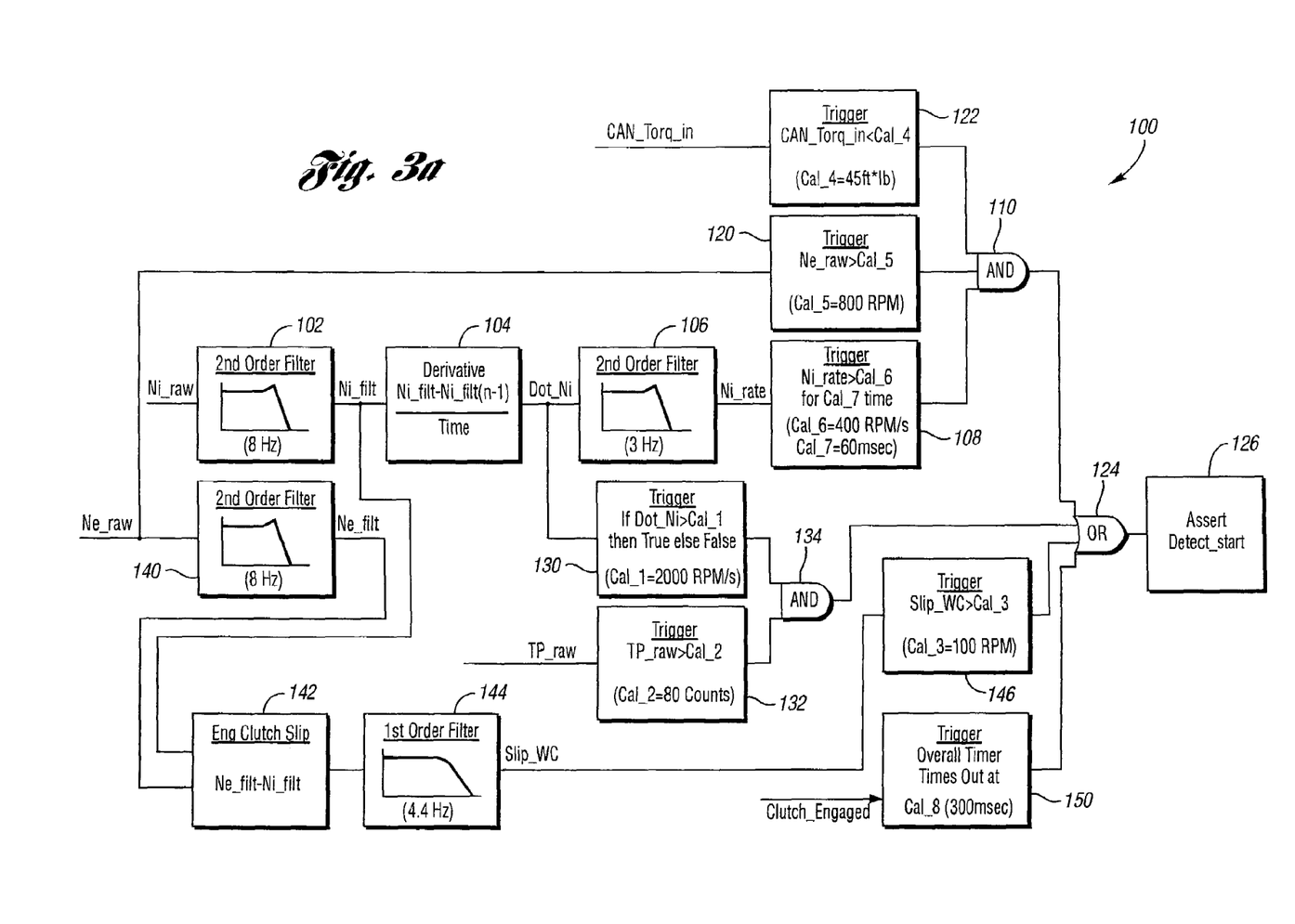
Figure 3B:
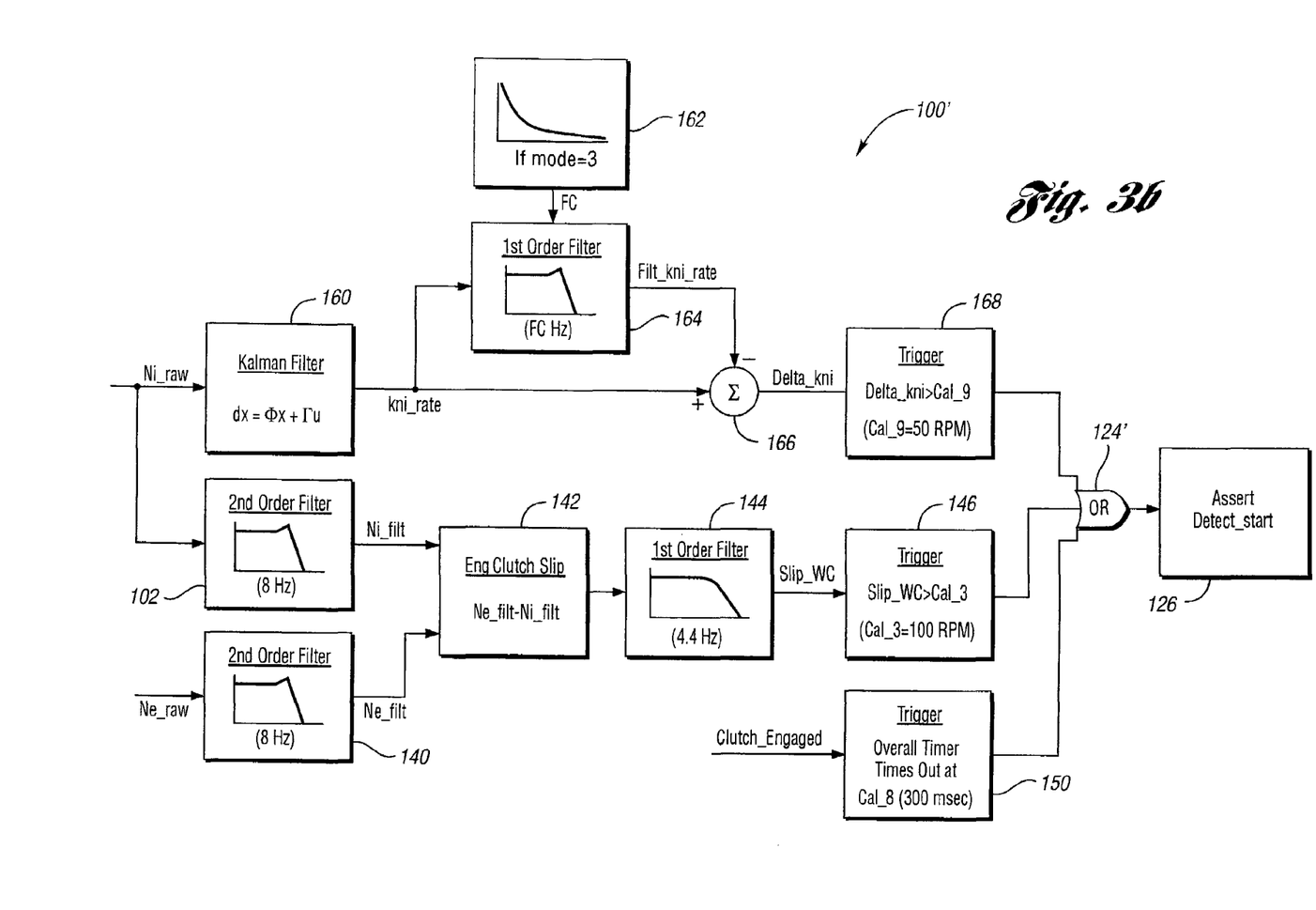
Figure 3C:
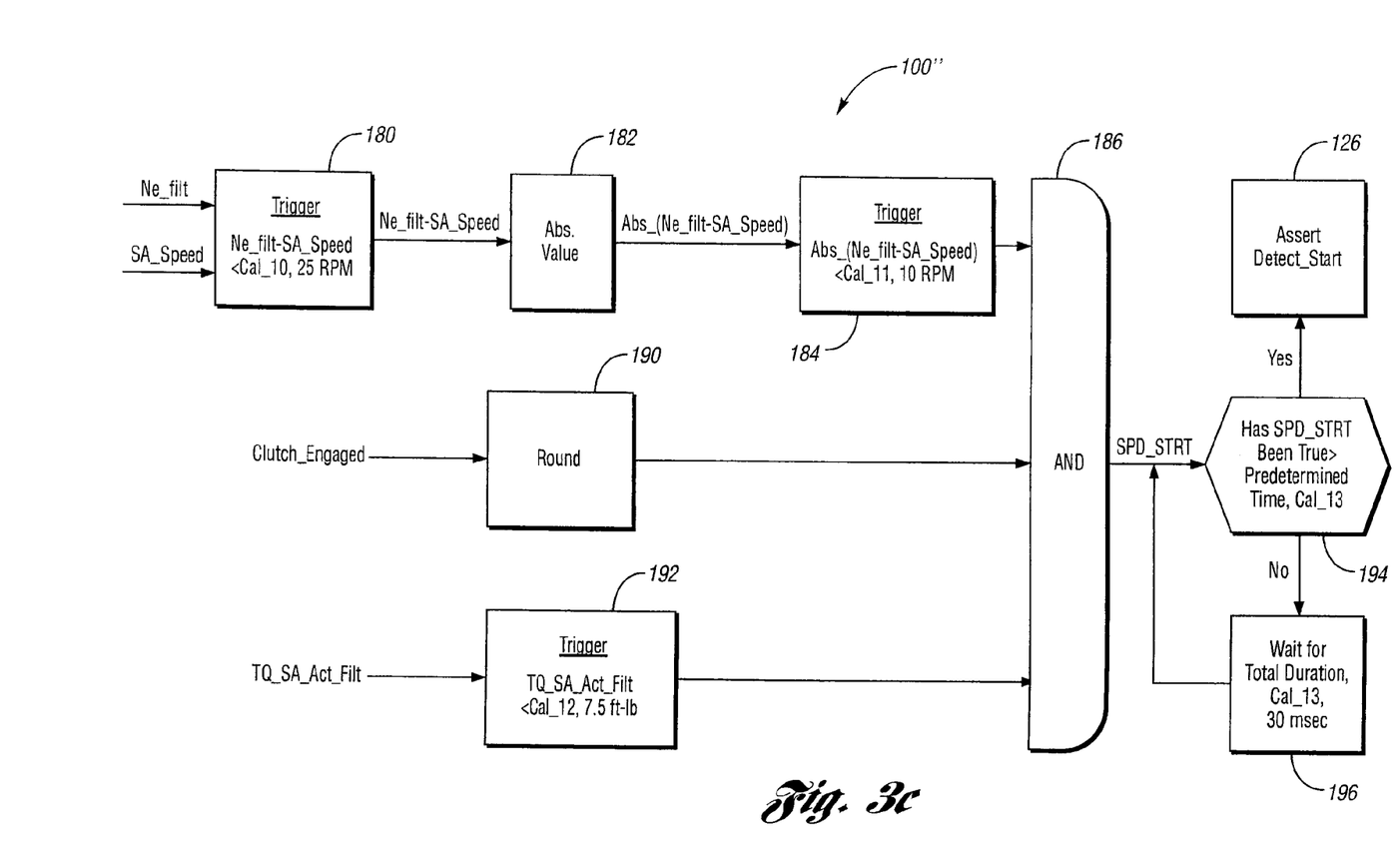

The engine start detection routine of the present invention is generally implemented in connection with a powertrain controller (not shown) having a memory. The powertrain controller generally receives a number of signals (described in detail in connection with FIGS. 3($a$-$c$)) that may be processed (e.g., filtered, compared, logically operated upon, etc.) to determine (i.e., detect) when engine start has occurred, and the controller may present a respective signal to indicate that engine start has occurred. The engine start detection process of the present invention may be implemented in hardware (e.g., logic circuitry), software, firmware, and any appropriate combination thereof to meet the design criteria of a particular application.

When the engine start is detected (e.g., via the system and method of the present invention), the controller generally controls the lock-up of the input clutch and substantially seamlessly releases control of the electric machine 20. As such, the engine 14 torque and electric machine 20 torque generally match, and at least one of efficiency, smoothness of the transition between power sources, and shift times are generally improved when compared to conventional approaches.

The engine start detection system and methods of the present invention generally use a signal from the transmission input speed sensor (e.g., input speed) as a first control signal. The acceleration at the transmission input is determined (e.g., calculated, derived, measured, etc.) using the transmission input speed and is used as a trigger signal (e.g., a second control signal). When the engine changes (i.e., transitions, shifts, etc.) from a motoring torque user (i.e., absorber) to a torque producer (i.e., generator), a rapid increase in transmission input acceleration generally occurs. The transition of the engine from a motoring torque user to a torque producer generally occurs during the actual engine start condition.

The transmission input acceleration may be calculated using one or more alternative embodiments of the present invention. In one example, the transmission input acceleration may be calculated using a simple (e.g., unfiltered, unaugmented, etc.) derivative of the transmission (e.g., the transmission 16) input speed signal. Under some vehicle operating conditions (e.g., when the transition torque is equal to or greater than a predetermined value), the simple derivative of transmission input speed may be used directly as the trigger signal.

In another example (e.g., under different operating conditions of the vehicle such as when the engine torque transition is difficult to distinguish), a filtered version of the transmission input acceleration may be used as the trigger signal. The alternative method may use a predictive Kalman filter algorithm to determine input speed acceleration. The input speed acceleration signal may also be filtered. The fast acceleration (i.e., the input speed acceleration signal) may be compared to the filtered version (i.e., the predictive Kalman filter algorithm version) to determine when the engine has started. Alternative strategies (i.e., methods, routines, processes, algorithms, steps, etc.) for determining engine start according to the present invention may be described as follows.

Referring to FIG. 3a, a block diagram illustrating a control method 100 of the present invention is shown. The method 100 generally includes determining a filtered acceleration of input speed to the power transmission assembly when the primary power generating system is deactivated, and inferring activation of the primary power generating system based at least in part on the acceleration of input speed to the power transmission assembly. In one example, The method 100 generally provides for determination of change in transmission input speed acceleration using a simple derivative of the transmission input speed for determining when an engine has started.

The powertrain controller that implements the strategy of the present invention may receive input signals at respective inputs. A first signal (e.g., Ni_raw) may be a transmission input speed signal, a second signal (e.g., Ne_raw) may be an engine speed signal, a third signal (e.g., CAN_Torq_in) may be a transmission input torque signal, a fourth signal (e.g., TP_raw) may be an actual throttle position signal, and a fifth input signal (e.g., Clutch_Engaged) may be a signal that indicates when the engine clutch is engaged (i.e., an engine clutch engagement signal).

The powertrain controller that implements the strategy of the present invention (e.g., the controller 30) may present a digital output signal (e.g., trigger signal, Detect_start) when an engine start condition has occurred. The routine 100 may determine (e.g., calculate, logically decide, compare, etc.) whether to assert a signal in response to at least one calibration (i.e., calibratable, predetermined, preset, and the like) parameter (i.e., factor, value, etc.), (e.g., Cal_x), where x is a reference character corresponding to a particular parameter.

There are generally four paths (or routes) that may generate the engine start trigger signal (i.e., assert, present, send, transmit, etc. the signal Detect_start that indicates the engine start condition has occurred) in the strategy 100. The first two paths described are below the generally the more preferred exit modes corresponding to vehicle operating conditions for the start detection strategy 100. The final two paths are generally implemented in case of unusual (i.e., atypical, abnormal, rarely encountered, etc.) vehicle operating circumstances (i.e., conditions, modes, etc.).

The first path is generally implemented to detect when light throttle pedal starts are initiated where only a slight change in input acceleration occurs such as when the engine is started due to the light loads. The first path of the strategy 100 generally comprises a block (e.g., circuit, apparatus, device, gate, step, operator, etc.) 102, a block 104, a block 106, a block 108, a block 110, a block 120, a block 122, a block 124, and a block 126.

The block 102 may be implemented as a filter (e.g., a second order, 8 Hz low pass filter). The block 104 may be configured to perform a simple derivative operation. The block 106 may be implemented as a filter (e.g., a second order, 3 Hz low pass filter). The block 108 may be implemented as a comparator and timer circuit. The block 110 may be implemented as a logic gate (e.g., an AND gate). The blocks 120 and 122 may be implemented as comparators. The block 124 may be implemented as a logic gate (e.g., an OR gate). The block 126 may present a signal (e.g., the trigger signal Detect_start).

The signal Ni_raw is generally filtered via the block 102 to minimize noise (e.g., extraneous signal content that is greater than a predetermined frequency such as 8 Hz) to generate a signal (e.g., Ni_filt). A simple derivative of the signal Ni_filt may be calculated via the block 104 to obtain a signal (e.g., Dot_Ni). The signal Dot_Ni is generally passed through the low pass filter 106 to generate a signal (e.g., Ni_rate).

The block 108 may determine whether the signal Ni_rate has maintained (i.e., is greater than) a minimum positive acceleration value (e.g., Cal_6) for a predetermined minimum time (e.g., Cal_7) to trigger the engine start (i.e., to provide for asserting the signal Detect_start as a digital True by presenting a digital True (i.e., a trigger signal) to a first input of the AND gate 110). In one example, the parameter Cal_6 may be equal to 400 RPM/s and the parameter Cal_7 may be equal to 60 msec. However, the parameters Cal_6 and Cal_7 may be implemented having any appropriate selected value to meet the design criteria of a particular application.

To reduce or eliminate false triggers on the first path of the strategy 100, two qualifying conditions are generally included and evaluated. The first qualifying condition may be determining that the engine is turning to a level near idle to ensure that the initial transient from the first engine compression cycle is mitigated. To implement the first qualifying condition, the signal Ne_raw is generally compared to a predetermined engine speed parameter value (e.g., Cal_5) using the comparator 120, and when the signal Ne_raw is greater than the parameter Cal_5, a digital True (i.e., a trigger signal) is generally presented by the comparator 120 to a second input of the AND gate 110. In one example, the parameter Cal_5 may be 800 RPM. However, the parameter Cal_5 may be implemented having any appropriate selected value to meet the design criteria of a particular application.

The second qualifying condition may be implemented to eliminate false triggers that the first path of the strategy 100 may generate during high torque start conditions. To implement the second qualifying condition, the signal CAN_Torq_in is generally compared to a predetermined torque parameter value (e.g., Cal_4) using the comparator 122, and when the signal CAN_Torq_in is less than Cal_4, a digital True (i.e., a trigger signal) is generally presented by the comparator 122 to a third input of the AND gate 110.

In one example, the parameter Cal_4 may be 45 ft-lb (i.e., 61 N-m). However, the parameter Cal_4 may be implemented having any appropriate selected value to meet the design criteria of a particular application. When the blocks 108, 120 and 122 all generate and present a digital True level (i.e., a trigger signal substantially simultaneously) to the AND gate 110, the AND gate 110 generally presents a digital True (i.e., a trigger signal) to a first input of the OR gate 124 and the OR gate 124 generally presents the signal Detect_start as a digital True signal via the block 126.

The second engine start detection path of the method 100 may be implemented to detect higher torque starts where the change in input acceleration is prominent (i.e., a predetermined level higher than) when compared to the base noise level and the timeliness of start detection is a high priority to the user of the vehicle (e.g., when the driver is sensitive to drivetrain roughness). The second engine start detection path of the method 100 generally comprises the block 102, the block 104, the block 124, the block 126, a block 130, a block 132, and a logic gate 134. The blocks 130 and 132 may be implemented as comparators. The block 134 may be implemented as a logic gate (e.g., an AND gate).

The unfiltered transmission input acceleration, Dot_Ni, (i.e., the signal presented by the block 104) may be compared to a predetermined threshold parameter value (e.g., Cal_1) via the comparator 130. When the signal Dot_Ni is greater than Cal_1, the comparator 130 generally presents a digital True level signal (i.e., a trigger signal) to a first input of the gate 134. In one example, the threshold Cal_1 may have a value 2000 rpm/s and the value of the threshold parameter Cal_6 may be 400 rpm/s. However, the parameters Cal_1 and Cal_6 may be implemented having any appropriate selected value to meet the design criteria of a particular application.

Assertion of the signal Detect_start via the second path of the process 100 may have a qualification to reduce or eliminate false assertions of the signal Detect_start. The signal TP_raw may be compared to a predetermined threshold parameter value (e.g., Cal_2). The signal TP_raw may be presented to the comparator 132.

When the signal TP_raw is greater than the parameter Cal_2, the comparator 132 generally presents a digital True level signal (i.e., a trigger signal) to a second input of the AND gate 134. In one example, the threshold Cal_2 may have a value equal to 80 counts (i.e., a count value related to a particular throttle position). However, the parameter Cal_2 may be implemented having any appropriate selected value to meet the design criteria of a particular application.

When the blocks 130 and 132 both present a digital True level to the AND gate 134, the AND gate 134 generally presents a digital True (i.e., a trigger signal) to a second input of the OR gate 124, and the OR gate 124 generally presents the signal Detect_start via the block 126.

The third path of the routine 100 may be used when the engine that is implemented in connection with the present invention starts early during the clutch engagement. The engine is generally producing torque when the engine speed is greater than the input speed of the transmission. The third path of the strategy 100 of the present invention comprises a block 140, a block 142, a block 144, a block 146, the gate 124, and the block 126.

The block 140 may be implemented as a filter (e.g., a second order, 8 Hz low pass filter). The block 142 may be implemented as an arithmetic processor configured to perform a subtraction (i.e., determine a difference). The block 144 may be implemented as a filter (e.g., a second order, 4.4 Hz low pass filter). The block 146 may be implemented as a comparator.

The signal Ne_raw is generally filtered via the block 140 to minimize noise (e.g., extraneous signal content that is greater than a predetermined frequency such as 8 Hz) to generate a signal (e.g., Ne_filt). A difference signal between the signal Ne_filt and the signal Ni_filt (i.e., a signal corresponding to the engine clutch slip) may be generated by the block 142, and filtered via the block 144 to generate a signal (e.g., Slip_WC).

The signal Slip_WC may be presented to the comparator 146 and compared with a predetermined parameter (e.g., CAl_3). When the signal Slip_WC is greater than the parameter Cal_3, the comparator 146 generally presents a digital True level signal (i.e., a trigger signal) to a third input of the OR gate 124, and the OR gate 124 generally presents the trigger signal Detect_start via the block 126. In one example, the threshold Cal_3 may have a value equal to 100 RPM. However, the parameter Cal_3 may be implemented having any appropriate selected value to meet the design criteria of a particular application.

The fourth path of the process 100 may include an overall timer (e.g., a block 150) that is started when the clutch engagement is complete (i.e., when the signal Clutch_Engaged is presented). The fourth path of the process 100 generally comprises the timer 150, the gate 124, and the block 126. The timer 150 is generally implemented to ensure that the strategy 100 does not get stuck in a loop when the other trigger paths are missed due to a failure or other reason.

The signal Clutch_Engaged may be presented to an input of the timer 150. When a duration of time (e.g., Cal_8) has passed, the timer 150 generally presents a digital True (i.e., a trigger signal) to a fourth input of the OR gate 124, and the OR gate 124 generally presents the signal Detect_start via the block 126. In one example, the parameter Cal_8 may be equal to 300 msec. However, the parameter Cal_8 may be implemented having any appropriate selected value (i.e., duration or interval of time) to meet the design criteria of a particular application.

When any of the blocks 110, 134, 146, and 150 present a digital True (i.e., a trigger signal) to the OR gate 124, the OR gate 124 generally presents the signal Detect_start via the block 126 as a digital True (i.e., an indication that the engine has started is generated).

Referring to FIG. 3b, a diagram of another strategy (i.e., a strategy 100') of the present invention is shown. The strategy 100' generally uses a Kalman filter to determine the transmission input speed acceleration based on measured input speed. The Kalman filtered version of the input speed acceleration is generally compared to a low-pass filtered version of the input speed acceleration. A positive divergence of the respective input speed acceleration signals generally indicates that a sudden increase in input acceleration has occurred. The sudden increase in input acceleration may be interpreted as an indication that the engine is starting to provide torque. To minimize potential false triggers, the filter constant of the low-pass filter may be varied to provide more sensitivity when the engine start is expected than in other operating conditions.

There are generally three paths (or routes) that may generate the engine start trigger signal (i.e., assert, present, send, transmit, etc. the signal Detect_start that indicates the engine start condition has occurred) via the strategy 100'.

The first path generally comprises a block 160, a block 162, a block 164, a block 166, a block 168, a block 124', and the block 126. The block 160 is generally implemented as a Kalman filter (e.g., a simple third order Kalman filter) that is configured to filter the transmission input speed signal Ni_raw. The block 162 is generally implemented as a control signal generator. The block 164 is generally implemented as a variable-constant, first order, low-pass filter. The block 166 is generally implemented as a combiner. The block 168 is generally implemented as a comparator. The block 124' is generally implemented as an OR logic gate having three inputs.

There are generally two input signals to the first path (i.e., the path that normally detects the engine start) of the strategy 100' (i.e., the transmission input speed, Ni_raw, and the engine speed, Ne_raw). The signal Ni_raw is passed through the Kalman filter 160 to generate a signal (e.g., Kni_rate). The signal Kni_rate may provide a prediction of the transmission input acceleration. One example of a Kalman filter algorithm that may be implemented via the filter 160 may be found, for example, in Hebbale and Ghoneim, "A Speed and Acceleration Estimation Algorithm for Powertrain Control", American Control Conference, 1991, pp. 415-420, which is hereby incorporated by reference in its entirety.

The signal Kni_rate may be filtered through the filter 164 to calculate a signal (e.g., Filt_kni_rate). The filter constant for the variable-constant filter 164 may be varied such that substantially no filtering is performed at the initiation of the strategy 100'. The engine is generally not expected to start at the time of the initiation of the strategy 100'. There may be transients in the system controlled via the strategy 100' due to the application of the engine clutch, and the transients may falsely trigger the engine start (i.e., cause false assertion of the signal Detect_start).

As performance of the routine 100' progresses (or continues), the block 162 may generate a signal (e.g., FC) that generally corresponds to a filter constant, and is presented to the filter 164. The filter constant of the filter 164 may be controlled by the signal FC. The block 162 generally exponentially decays (i.e., adjusts downward) the value of the signal FC to a minimum value so that the filter 164 has the highest level of sensitivity when the engine is expected to start (i.e., from the initiation of the routine 100').

The signal Kni_rate is generally subtracted from the signal Filt_kni_rate using the combiner 166 (i.e., the signal Kni_rate and an inverse of the signal Filt_kni_rate are combined) to obtain (i.e., generate, produce, calculate, determine, etc.) a difference signal (e.g., Delta_kni).

The signal Delta_kni may be presented to the comparator 168 and compared with a predetermined parameter (e.g., CAl_9). When the signal Delta_kni is greater than the parameter Cal_9, the comparator 168 generally presents a digital True level signal (i.e., a trigger signal) to a first input of the OR gate 124', and the gate 124' may present the trigger signal Detect_start via the block 126. In one example, the threshold Cal_9 may have a value equal to 50 RPM. However, the parameter Cal_9 may be implemented having any appropriate selected value to meet the design criteria of a particular application.

The other two paths of the method 100' are implemented for unusual vehicle operating circumstances and are substantially the same as the third and fourth paths of those used in the strategy 100. When any of the blocks 146, 150, and 168 present a digital True (i.e., a trigger signal) to the OR gate 124', the OR gate 124' generally presents the signal Detect_start as a digital True (i.e., an indication that the engine has started is generated) via the block 126.

Referring to FIG. 3*c*, yet another example engine start detection strategy (i.e., strategy 100") of the present invention is shown. The control method 100" generally includes determining speed of the secondary power generating system, and a filtered version the primary power generating system speed, and inferring activation of the primary power generating system based at least in part on the absolute value of the difference between the filtered engine speed signal and the speed of the secondary power generating system.

When the routine 100" is implemented, the S/A motor (i.e., the electric machine 20) is generally placed in a uni-directional speed control mode of operation during the start sequence rather than torque control, as is the case in the previous methods described (i.e., the methods 100 and 100'). When the motor speed exceeds the set point, no attempt is generally made to maintain speed. The S/A 20 motor speed may be intentionally set slightly below that of the engine idle control speed to reduce or eliminate a tendency for the S/A 20 motor speed controller and the engine speed controller to 'fight' each other for control (i.e., assert incompatible speed control signals).

Before the engine 14 starts to deliver torque, the engine is generally a net load on the S/A 20. The S/A 20 may be forced to exert effort (i.e., torque) to maintain a set speed. When the engine 14 begins to produce torque, the net torque is positive and the engine 14 speed generally increases without receiving torque from the S/A 20. The electric machine 20 is in uni-directional control (i.e., only positive torques will be utilized by the electric machine 20 to maintain the desired input speed), and does not generally attempt to counteract the engine 14. The motor speed may increase without disturbance from the engine. The engine start may be detected by determining the condition when the S/A 20 is no longer exerting effort to maintain speed using the method 100" of the present invention generally as follows (as numerically referenced in FIG. 4*d*).

1.) Key-start or brake-off trigger initiates start sequence.

2.) The S/A 20 spins in uni-directional speed control a calibratable rpm (e.g., Cal_10) below the desired idle speed.

3.) The disconnect clutch is engaged and the engine 14 speed is synchronized to the S/A speed.

4.) The engine 14 is fueled and ignition begins.

FIG. 3*c* generally illustrates the start detection logic (i.e., routine 100") of the present invention. The strategy 100" generally provides for the start detection asserted as True (i.e., the trigger signal Detect-start is asserted) when, 1.) The absolute value of the filtered engine speed minus the S/A 20 speed is less than a calibratable value (e.g., Cal_11).

2.) The transmission controller recognizes that the disconnect clutch is full engaged.

3.) The Starter/Alternator 20 torque is less than a calibratable value (e.g., Cal_12).

All three of these criteria are generally True for a predetermined length of time (e.g., a time duration or interval, e.g., Cal_13) before the strategy 100" detects an engine start and asserts the signal Detect_start.

The powertrain controller that implements the strategy 100" of the present invention may receive input signals at respective inputs. A first signal may be the filtered engine speed signal Ne_filt, a second signal (e.g., SA_speed) may be a S/A uni-directional speed signal, a third signal may be the signal Clutch_Engaged that indicates when the engine clutch is engaged, and a fourth signal (e.g., TQ_SA_Act_filt) may be a signal that corresponds to a filtered version of S/A torque.

The method 100" generally comprises a block 180, a block 182, a block 184, a block 186, a block 190, a block 192, a block 194, a block 196, and the block 126. The block 180 may be implemented as an arithmetic processor configured to perform a subtraction (i.e., determine a difference) and a comparison. The block 182 may be implemented as an arithmetic processor configured to perform an absolute value determination. The blocks 184 and 192 may be implemented as comparators. The block 186 may be implemented as a logic gate (e.g., an AND gate). The block 190 may be implemented as an arithmetic processor configured to perform a rounding operation (e.g., an operation configured to reduce or eliminate metastable states from the signal Clutch_Engaged). The block 194 may be implemented as a decision block. The block 196 may be implemented as a time delay block.

A difference signal between the signal Ne_filt and the signal SA_speed (i.e., a signal corresponding to the engine clutch slip) may be generated, and compared to the predetermined, calibratable speed parameter Cal_10 by the block 180. When the difference between the signal Ne_filt and the signal SA_speed is less than Cal_10, the block 180 generally presents the difference between the signal Ne_filt and the signal SA_speed to an input of the block 182. In one example the parameter Cal_10 may be implemented having a value 25 RPM. However, the parameter Cal_10 may be implemented having any appropriate value to meet the design criteria of a particular application.

The block 182 may generate the absolute value of the difference between the signal Ne_filt and the signal SA_speed, and present the absolute value of difference between the signal Ne_filt and the signal SA_speed to an input of the comparator 184. When the absolute value of difference between the signal Ne_filt and the signal SA_speed is less than the predetermined, calibratable speed parameter Cal_11, the block 184 generally presents a digital True signal level (i.e., a trigger signal) to a first input of the AND gate 186. In one example the parameter Cal_11 may be implemented having a value 10 RPM. However, the parameter Cal_11 may be implemented having any appropriate value to meet the design criteria of a particular application.

The block 190 may have an input that may receive the signal Clutch_Engaged and present a rounded version of the signal Clutch_Engaged (e.g., aversion of the signal Clutch_Engaged having a reduced occurrence of metastable states) to a second input of the AND gate 186 as a digital True level signal (i.e., a trigger signal).

The comparator 192 may have an input that may receive the signal TQ_SA_Act_filt. The comparator 192 may the signal TQ_SA_Act_filt to the predetermined, calibratable torque parameter Cal_12. When the value of the signal TQ_SA_Act_filt is less than Cal_12, the block 192 generally presents a digital True signal level (i.e., a trigger signal) to a third input of the AND gate 186. In one example the parameter Cal_12 may be implemented having a value of about 7.5 ft-lb (i.e., about 10 N-m). However, the parameter Cal_12 may be implemented having any appropriate value to meet the design criteria of a particular application.

When the blocks 184, 190 and 192 all generate and present a digital True level (i.e., a trigger signal substantially simultaneously) to the AND gate 186, the AND gate 186 generally presents a signal (e.g., SPD_STRT) to the decision block 194. When the signal SPD_STRT has been presented for a time interval (i.e., a duration) greater than the predetermined, calibratable time parameter (e.g., Cal_13) (i.e., the YES leg of the decision block 194, the block 126 generally presents the trigger signal Detect_start as a digital True level.

In one example the parameter Cal_13 may be implemented having a value 30 msec. However, the parameter Cal_13 may be implemented having any appropriate value to meet the design criteria of a particular application. The predetermined time Cal_8 generally has a longer duration than the predetermined time Cal_13.

Returning to the decision block 194, when the signal SPD_STRT has been presented for a time interval (i.e., a duration) equal to or less than the predetermined, calibratable time parameter Cal_13 (i.e., the NO leg of the decision block 194, the block 196 generally delays the operation 100" (i.e., waits using a timer (not shown) that is set or activated when the process 100" is initiated) for the predetermined, calibratable time parameter Cal_13 and returns to the decision block 194.

Figure 4A:
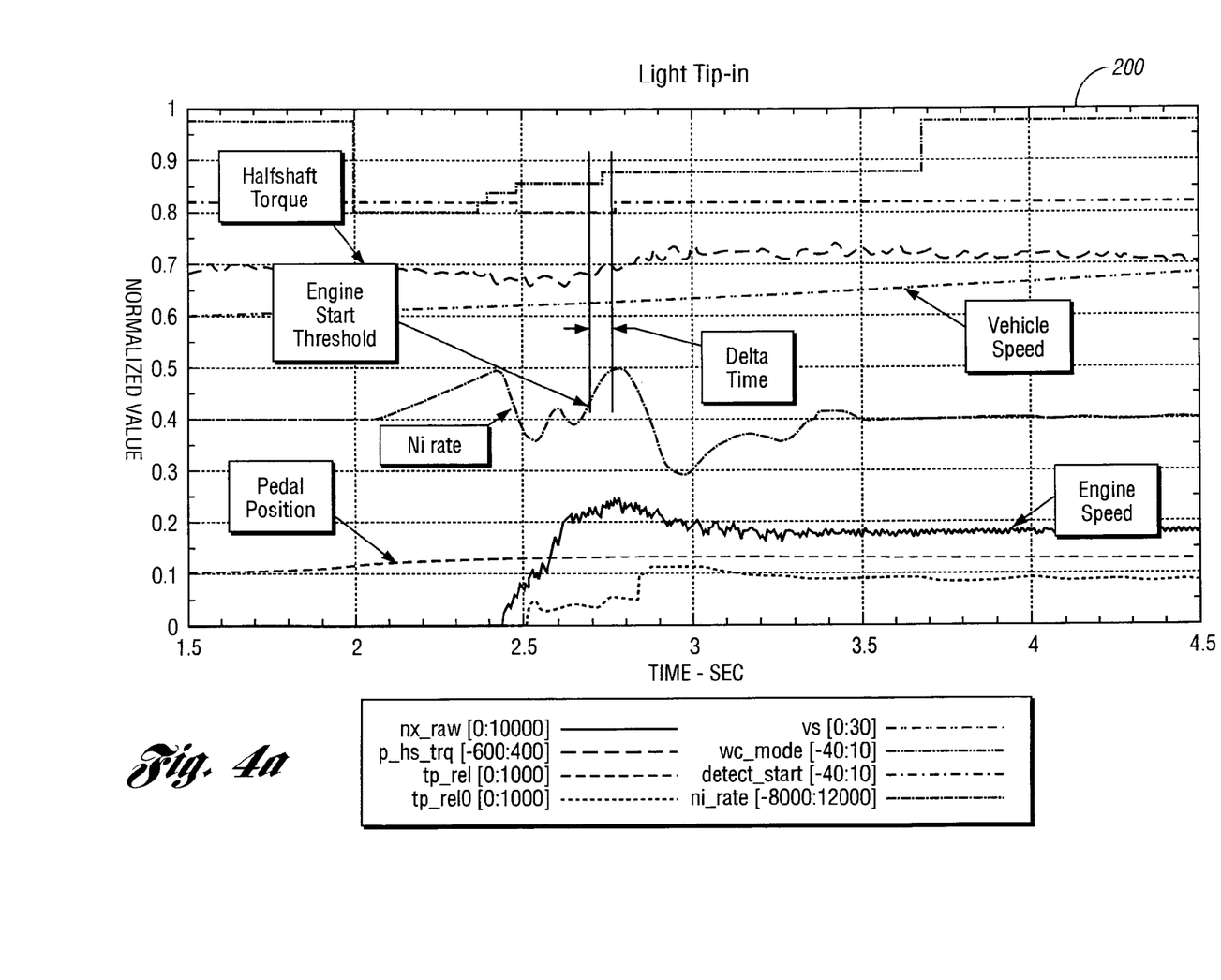

Referring to FIG. 4a, a plot 200 of the first path trigger in strategy 100 under low pedal demand is shown. The engine start flag (e.g., the signal Detect_start) is set to zero (i.e., "off", de-asserted, a digital False, LOW, or 0 state) at the start of the algorithm 100. When the filtered input speed acceleration (e.g., the signal Ni_rate) crosses the threshold Cal_6, the timer of the block 108 is generally started. When the timer of the block 108 expires (i.e., Delta time=Cal_7), the engine start flag is generally set to one (i.e., "on", asserted, a digital True, HIGH, or 1 state). Halfshaft torque and engine speed generally remain smooth through the transition.

Figure 4B:
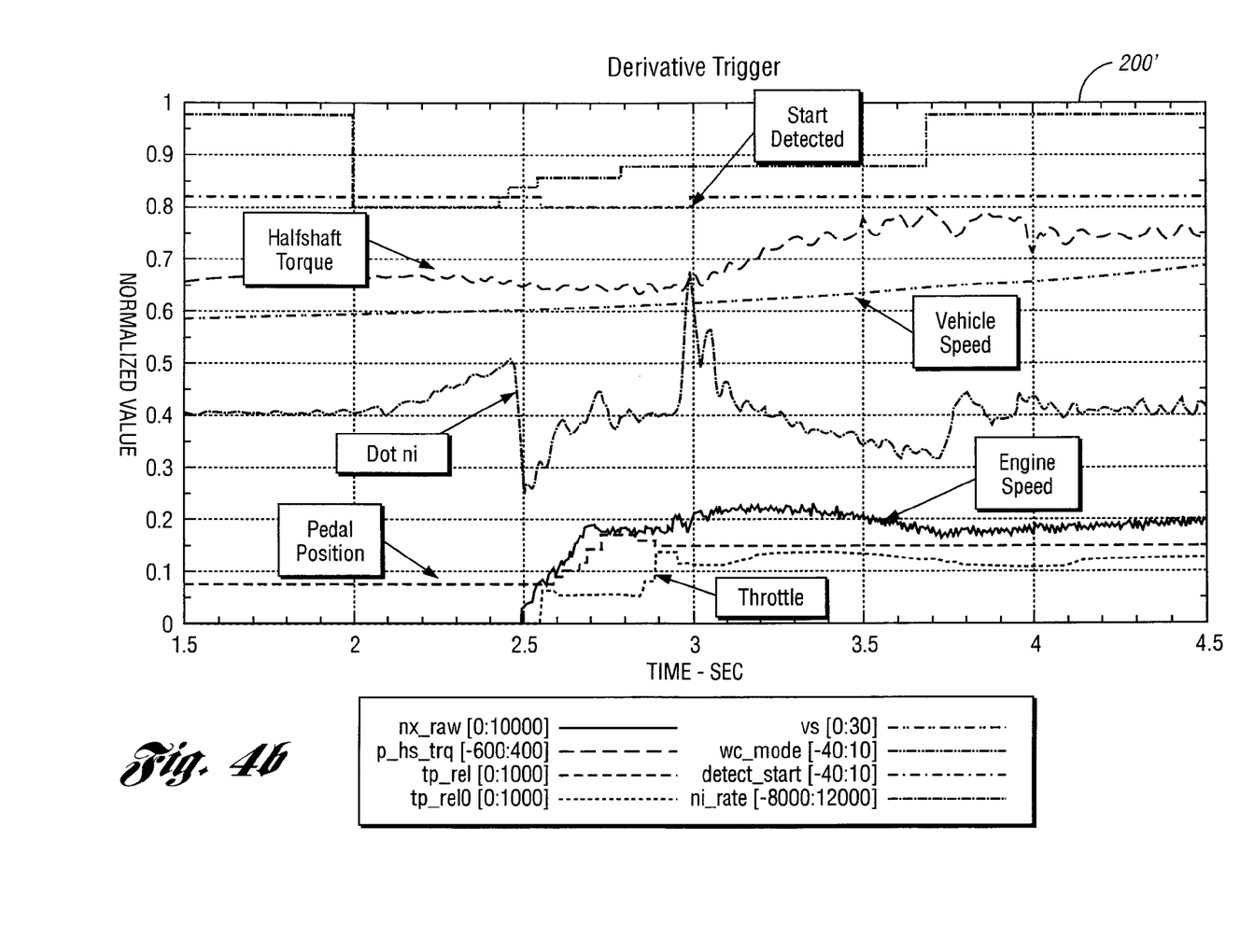

Referring to FIG. 4b, a plot 200' of the second path trigger in strategy 100 using the fast input acceleration signal (e.g., the signal Dot_ni) is shown. When the pedal is increased from 80 counts to 150 counts, the power demand increase causes an engine start request. The actual throttle position goes above the minimum limit (i.e., above the predetermined threshold value, Cal_2). When the actual throttle position transitions above the minimum limit Cal_2, the signal Dot_ni increases rapidly when the engine begins to fire, and the Detect_start flag is generally set to one.

Figure 4C:
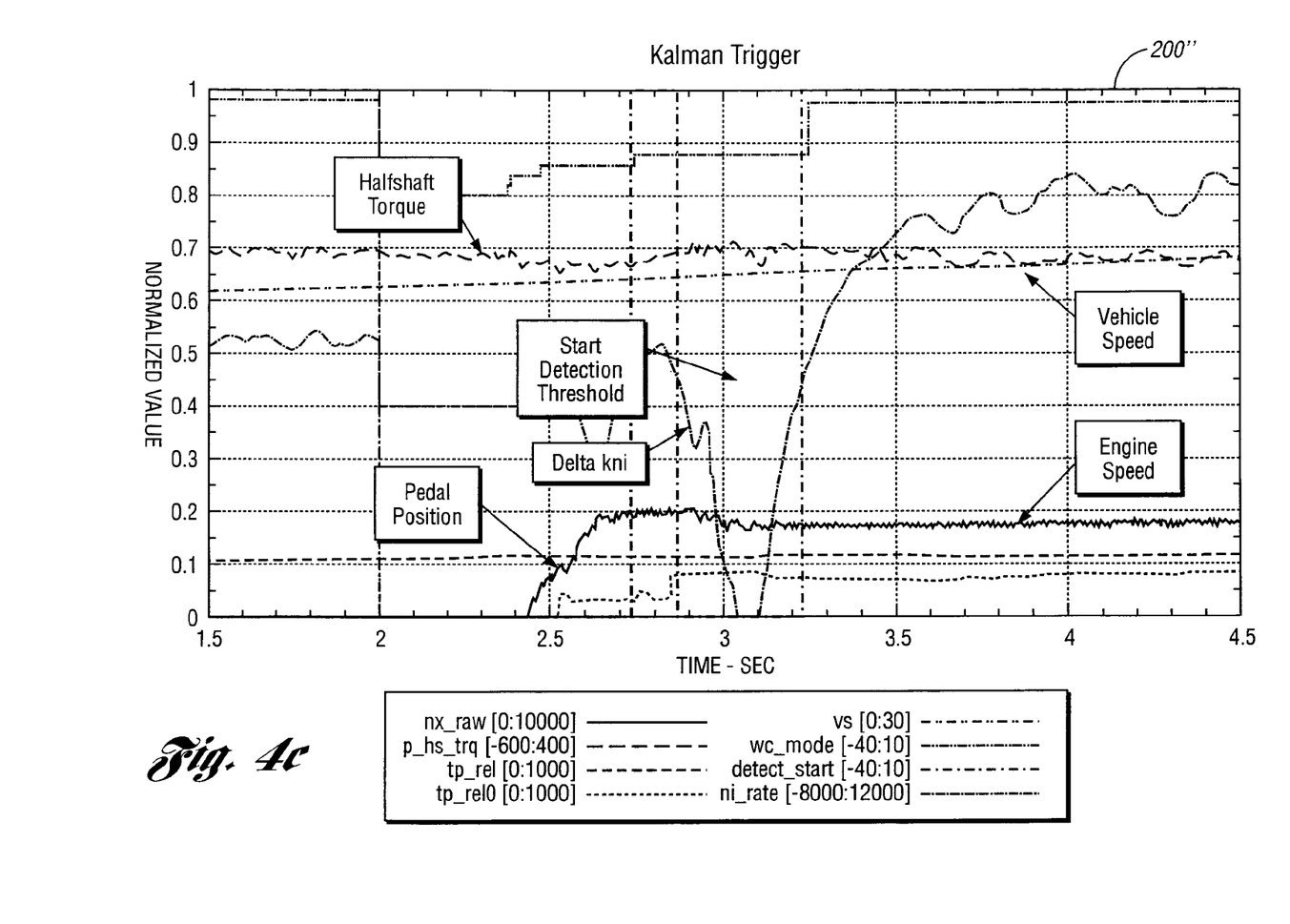

Referring to FIG. 4c, a plot 200" of the first path trigger in strategy 100' (i.e., the path of the Kalman filter based trigger process) is shown. When the engine 14 starts, there is a sudden increase in the transmission input acceleration. The increase in the transmission input acceleration generally causes the signal Delta_kni to transition to a positive value. When the signal Delta_kni reaches the calibrated threshold Cal_9, the Detect_start flag is set to one. The event illustrated as plot 200" is for a light pedal engine start, however the method 100' performs independently of throttle.

Referring to FIG. 4d a plot 200''' illustrating the start detection sequence of the strategy 100" is shown. Overall, the Kalman filter based technique 100' is generally slightly faster than the other methods of the present invention but the difference is slight.

All of the methods of the present invention generally provide a smooth, seamless, reliable, and nearly imperceptible transition from only electric motor drive to internal combustion engine drive (or combined electric motor and internal combustion engine drive). The engine start detection strategies of the present invention are generally robust under a variety of vehicle operating conditions.

The various digital signals (e.g., signals presented by the blocks 108, 120, 124, 126, 134, 146, 150, 168, and the like) may be presented as "on" (i.e., asserted) as a digital True, HIGH, or 1 state, and "off" (i.e., de-asserted) as a digital False, LOW, or 0 state. However, the "on" and "off" conditions of the signals may be presented as any appropriate state, level, value, polarity, or condition to meet the design criteria of a particular application.

While the best mode for carrying out the invention has been described in detail, those familiar with the art to which this invention relates will recognize various alternative designs and embodiments for practicing the invention as defined by the following claims.

The invention claimed is:

1. A method for operating a hybrid vehicle having a primary power generating system and a secondary power generating system coupled via a power transmission assembly for delivery of tractive force for the vehicle, the method comprising:

determining acceleration of input speed to the power transmission assembly when the primary power generating system is deactivated; and inferring activation of the primary power generating system based at least in part on the acceleration of the power transmission assembly, wherein the primary power generating system comprises an internal combustion engine, the secondary power generating system comprises an electric machine that performs as a motor in one mode of operation, and performs as a generator in another mode of operation:

operating the hybrid vehicle comprises engine start detection and activation of the primary power generating system comprises engine start;

determining acceleration of input speed to the power transmission assembly comprises determining a transmission input speed, filtering the transmission input speed, determining a derivative of the filtered transmission input speed, and filtering the derivative of the filtered transmission input speed; and inferring activation of the primary power generating system comprises determining an engine speed and a transmission input torque;

generating a first trigger signal when the filtered derivative of the filtered transmission input speed is greater than a first predetermined acceleration for a first predetermined time;

generating a second trigger signal when the engine speed is greater than a second predetermined speed;

generating a third trigger signal when the transmission input torque is greater than a predetermined torque level; and asserting an engine start signal when the first, second, and third trigger signals are substantially simultaneously generated.

2. The method set forth in claim 1 wherein the transmission input speed is filtered using a first second order low pass filter and the derivative of the filtered transmission input speed is filtered using a second second order low pass filter.

3. The method set forth in claim 1 further including the steps of:

determining an actual throttle position;

generating a fourth trigger signal when the derivative of the filtered transmission input speed is greater than a fourth predetermined speed;

generating a fifth trigger signal when the actual throttle position is greater than a predetermined position; and asserting the engine start signal when the fourth and fifth trigger signals are substantially simultaneously generated.

4. The method set forth in claim 1 further including the steps of:

filtering the engine speed;

determining a difference between the filtered engine speed and the filtered transmission input speed;

filtering the difference between the filtered engine speed and the filtered transmission input speed; and asserting the engine start signal when the filtered difference between the filtered engine speed and the filtered transmission input speed is greater than a fourth predetermined speed.

5. The method set forth in claim 4 wherein the engine speed is filtered using a third second order low pass filter and the difference between the filtered engine speed and the filtered transmission input speed is filtered using a first order low pass filter.

6. The method set forth in claim 1 further including the steps of:

determining an engine clutch engagement; and asserting the engine start signal when the engine clutch is engaged for a duration greater than a second predetermined time.

7. A method for operating a hybrid vehicle having a primary power generating system and a secondary power generating system coupled via a power transmission assembly for delivery of tractive force for the vehicle, the method comprising:

determining acceleration of input speed to the power transmission assembly when the primary power generating system is deactivated; and inferring activation of the primary power generating system based at least in part on the acceleration of the power transmission assembly, wherein the primary power generating system comprises an internal combustion engine, the secondary power generating system comprises an electric machine that performs as a motor in one mode of operation, and performs as a generator in another mode of operation;

operating the hybrid vehicle comprises engine start detection and activation of the primary power generating system comprises engine start;

determining acceleration of input speed to the power transmission assembly comprises determining a first signal indicative of transmission input speed and determining a derivative of the first signal; and inferring activation of the primary power generating system comprises determining another signal indicative of the derivative of the first signal;

generating a first trigger signal when the other signal indicative of the derivative of the first signal is greater than a first predetermined acceleration for a first predetermined time; and asserting an engine start signal when at least the first trigger signal is generated.

8. The method set forth in claim 7 wherein the other signal indicative of the derivative of the first signal is the derivative of the first signal.

9. The method set forth in claim 7 wherein determining the other signal indicative of the derivative of the first signal comprises filtering the derivative of the first signal.

10. The method set forth in claim 7 wherein determining the first signal comprises determining a transmission input speed and filtering the transmission input speed.

11. The method set forth in claim 10 wherein the other signal indicative of the derivative of the first signal is the derivative of the first signal.

12. The method set forth in claim 10 wherein determining the other signal indicative of the derivative of the first signal comprises filtering the derivative of the first signal.

* * * * *